United States Patent
Yakura et al.

(10) Patent No.: US 7,033,082 B2
(45) Date of Patent: Apr. 25, 2006

(54) ANGULAR CONTACT BALL BEARING AND SPINDLE DEVICE

(75) Inventors: Kenji Yakura, Kanagawa (JP); Takaaki Anzai, Kanagawa (JP); Yasushi Morita, Kanagawa (JP); Naoki Matsuyama, Kanagawa (JP)

(73) Assignee: NSK Ltd., Tokyo (JP)

( * ) Notice: Subject to any disclaimer, the term of this patent is extended or adjusted under 35 U.S.C. 154(b) by 144 days.

(21) Appl. No.: 10/756,338

(22) Filed: Jan. 14, 2004

(65) Prior Publication Data

US 2004/0146231 A1   Jul. 29, 2004

Related U.S. Application Data

(62) Division of application No. 10/207,784, filed on Jul. 31, 2002, now Pat. No. 6,709,161.

(51) Int. Cl.
 *F16C 33/38* (2006.01)
(52) U.S. Cl. .................................. 384/528; 384/523
(58) Field of Classification Search ............... 384/528, 384/527, 530, 534, 580, 523
 See application file for complete search history.

(56) References Cited

U.S. PATENT DOCUMENTS

| 2,316,449 | A | | 4/1943 | Parker |
| 4,844,628 | A | * | 7/1989 | Knappe ............... 384/510 |
| 5,727,095 | A | | 3/1998 | Hoeting |

FOREIGN PATENT DOCUMENTS

| DE | 3902314 A1 | 8/1989 |
| DE | 3706013 C2 | 12/1992 |
| DE | 4327815 C2 | 12/1997 |
| GB | 361276 | 11/1931 |
| JP | 2-122215 U | 10/1990 |
| JP | 5-22853 | 3/1993 |
| JP | 6-6752 | 1/1994 |
| JP | 9-21425 | 1/1997 |
| JP | 9-210072 | 8/1997 |
| JP | 11-108068 | 4/1999 |
| JP | 2000-136829 | 5/2000 |
| JP | 2000-145794 A | 5/2000 |

OTHER PUBLICATIONS

Japanese Abstract No. 07004439, dated 01/10/1995.
Japanese Abstract No. 11173338, dated 06/26/1999.

(Continued)

*Primary Examiner*—Lenard A. Footland
(74) *Attorney, Agent, or Firm*—Sughrue Mion, PLLC

(57) ABSTRACT

An angular contact ball bearing includes an outer ring having an outer ring race formed on an inner surface thereof, an inner ring having an inner ring race provided on the outer surface thereof, a plurality of rolling elements provided between the outer ring and the inner ring, an annular cage for retaining the rolling elements, and seals provided on openings between the respective ends of the inner and outer rings. The cage is made of a synthetic resin material and is supported through the guide of the rolling elements. The cage includes a plurality of cylindrical pockets arranged peripherally for retaining the rolling elements and a reduced diameter portion formed at ends of the pocket for regulating the radial movement of the cage while being in contact with the rolling element.

2 Claims, 12 Drawing Sheets

OTHER PUBLICATIONS

Japanese Abstract No. 11093959, dated 04/06/1999.
Japanese Abstract No. 09021425, dated 01/21/1997.
Japanese Abstract No. 07332379, dated 12/22/1995.
Japanese Abstract No. 61160628, dated 07/21/1986.

* cited by examiner

ANGULAR CONTACT BALL BEARING AND SPINDLE DEVICE

This is a divisional of application Ser. No. 10/207,784 filed Jul. 31, 2002, now U.S. Pat. No. 6,709,161; the disclosure of which is incorporated herein by reference.

BACKGROUND OF THE INVENTION

1. Field of the Invention

The invention relates to an angular contact ball bearing with a non-contact seal member having a counterbore formed on an outer ring which is used in a spindle or the like for motors or machine tools which are required to operate at higher speed or exhibit a prolonged life, and a grease-lubricated angular contact ball bearing with a seal member, which is used for rotatably supporting the spindle. Further, the invention relates to a spindle device for machine tool with the angular contact ball bearing.

2. Description of the Related Art

Bearings for the spindle of machine tools are mostly lubricated with grease from the standpoint of cost or because such a lubrication system is free from maintenance. The spindle of machine tools have been required to operate at higher rotating speed from the necessity of meeting the requirements for higher productivity. To this end, bearings have been required to operate at higher rotating speed.

In particular, when an angular contact ball bearing having a counterbore formed on the outer ring operates at a high rotating speed while being lubricated with a grease, the base oil (lubricant) of the grease can be easily discharged due to the presence of the counterbore on the outer ring, deteriorating the retention of the lubricant in the races and hence causing mallubrication. This is disadvantageous in the durability of bearing.

When an angular contact ball bearing comprising a non-contact seal member merely mounted in the vicinity of both the axial ends of the outer ring operates at a high rotating speed, the grease in the bearing moves toward the axial ends and then is attached to the sealed portion. Although the grease itself cannot be scatted from the interior of the bearing, the base oil can be little supplied from the grease attached to the sealed portion back into the races. Thus, this type of angular contact ball bearing is insufficient in the elimination of defective grease lubrication.

In order to solve these problems, the angular contact ball bearing disclosed in Japanese Patent Laid-Open No. 1999-108068 has a grease storing groove machined on the inner surface of the outer ring so that a contact area (contact ellipse) of the outer ring race with the balls can be provided even if no non-contact seal members are mounted. In this arrangement, the base oil (lubricant) can be supplied from the grease accumulated in the storing groove back into the races, making it possible to prolong the life of the bearing as compared with the conventional bearings.

However, the angular contact ball bearing disclosed in the above cited Japanese Patent Laid-Open No. 1999-108068 is disadvantageous in that when dmN (permissible rotating speed) is as high as not lower than 1,000,000, the grease storing groove formed on the inner surface of the outer ring is not enough to inhibit the scattering of the grease accumulated in the bearing, making it difficult to make sufficient use of the grease accumulated in the bearing and hence allow the grease to contribute to lubrication.

Further, it is necessary that a grease storing groove be machined on the inner surface of the outer ring every individual bearing, preventing the reduction of production cost.

In addition, FIG. 16 is a sectional view of essential part of a conventional sealed angular contact ball bearing. The angular contact ball bearing 100 comprises an outer ring 101 having an outer ring race 101a formed on the inner surface thereof, an inner ring 103 having an inner ring race 103a formed on the outer surface thereof and a plurality of steel balls 105 disposed as rolling elements between the outer ring race 101a of the outer ring. 101 and the inner ring race 103a of the inner ring 103. The plurality of balls 105 are peripherally retained at intervals by an annular cage 106 disposed between the inner surface of the outer ring 101 and the outer surface of the inner ring 103. Further, non-contact type seals 109, 110 are mounted on the opening of both the ends of the outer ring 101 and the inner ring 103.

A shoulder portion 102 is formed at one side of the outer ring race 101a on the inner surface of the outer ring 101. On the outer surface of the inner ring 103 is formed a shoulder portion 104 symmetrically with the shoulder portion 102 of the outer ring 101 about the ball 105. By thus providing the outer ring 101 and the inner ring 103 with the shoulder portions 102 and 104, respectively, the angular contact ball bearing 100 can receive the radial load as well as the axial load.

The cage 106 is formed annually by a phenolic resin and has a plurality of cylindrical pockets 107 disposed peripherally for receiving and retaining the balls 105. The outer diameter of the cage 106 is formed slightly smaller than the inner diameter of the shoulder portion 102 of the outer ring 101. The inner diameter of the cage 106 is formed greater than the outer diameter of the shoulder portion 104 of the inner ring 103.

There is formed a small guide gap 108 between the outer surface of the cage 106 and the inner surface of the shoulder portion 102 of the outer ring 101. The grease is injected into the guide gap 108 to lubricate the cage 106 with respect to the outer ring 101.

However, the conventional sealed angular contact ball bearing 100 as shown in FIG. 16 is disadvantageous in that since the cage 106 is supported guided by the outer ring 101, the cage 106 undergoes self-excited vibration that causes the generation of abnormal noise when the guide gap 108 runs out of grease upon high speed rotation of the bearing 100.

Further, since the inner surface of the outer ring 101 and the outer surface of the cage 106 in the guide gap 108 come in contact with each other, the rise in the rotating speed of the bearing 100 is accompanied by the rise in the heat generation due to friction, causing a temperature rise.

In order to solve this problem, it can be proposed that a snap cage guided by rolling elements for use in deep groove ball bearing be used. This approach causes no generation of friction between the cage and the inner and outer rings but is not suitable for angular contact ball bearings, which have many balls incorporated therein, because such a snap cage has an insufficient strength.

In general, an angular contact ball bearing is used to support the spindle for machine tools which is required to rotate at a high precision. When the aforementioned conventional sealed angular contact ball bearing 100 is mounted on the spindle for machine tools, the temperature of the bearing rises due to self-excited vibration or friction of the cage 106 during the high speed rotation of the spindle, lowering the machining precision of machine tools.

Further, when the machine tools operate, the generation of noise increases due to the generation of abnormal noise by the cage 106.

SUMMARY OF THE INVENTION

It is therefore an object of the invention to solve these problems and provide an angular contact ball bearing which is little subject to scattering of the grease accumulated in the bearing during high speed rotation and thus can attain the prolongation of life during grease-lubricated high speed rotation at a reduced cost.

Further, an object of the invention is to provide a sealed angular contact ball bearing which can lubricate the cage more fairly to lower the self-excited vibration thereof, making it possible to prevent the generation of abnormal noise and reduce the heat generation due to friction.

In addition, another object of the invention is to inhibit the temperature rise of a sealed angular contact ball bearing for use in supporting of the spindle for machine tools due to self-excited vibration or friction, making it possible to enhance the machining precision of machine tools.

To solve the above object, according to a first aspect of the invention, there is provided an angular contact ball bearing, including:

an outer ring having an outer ring race and a counterbore formed on an inner surface thereof and a pair of seal fitting grooves formed in the vicinity of both axial ends of the inner surface;

an inner ring having an inner ring race formed on the outer surface thereof;

a plurality of rolling elements disposed between the outer ring and the inner ring;

a cage having a pocket for retaining the rolling elements; and a pair of non-contact seals each having a mounting fitting portion provided on an outer surface thereof, which is fitted into the seal fitting groove of the outer ring, wherein the mounting fitting portion of the non-contact seal disposed on a counterbore side has an inner diameter smaller than the minimum inner diameter of the seal fitting groove of the outer ring and greater than the maximum diameter of the cage, and wherein the pair of seal fitting grooves have a gap which is not smaller than a diameter of the pocket of the cage and not greater than a width of the cage.

According to a second aspect of the invention, in the angular contact ball bearing according to the first aspect, an outer diameter of the cage on the counterbore side thereof is larger than that of the cage on a side opposite to the counterbore.

According to a third aspect of the invention, in the angular contact ball bearing according to the first aspect, the seal fitting groove has a tapered inner surface extending obliquely and radially to increase in radius from an end surface of the outer ring toward an axial interior of the outer ring and an end surface extending continuously from the tapered inner surface through a corner and inwardly in a radial direction.

According to a fourth aspect of the invention, in the angular contact ball bearing according to the third aspect, a taper angle of the tapered inner surface ranges from 1° to 30°.

According to a fifth aspect of the invention, in the angular contact ball bearing according to the first aspect, the outer ring has a first seal fitting groove provided on the counterbore side thereof and a second seal fitting groove provided on a side opposite to the counterbore and the depth of the first seal fitting groove is lower than that of the second seal fitting groove.

According to a sixth aspect of the invention, in the angular contact ball bearing according to the fifth aspect, the first and second seal fitting grooves have first and second tapered inner surfaces extending obliquely and radially to increase in radius from an end surface of the outer ring toward an axial interior thereof and an oblique angle of the second tapered inner surface is larger than that of the first tapered inner surface.

According to a seventh aspect of the invention, there is provided an angular contact ball bearing, including:

an outer ring having an outer ring race formed on an inner surface thereof;

an inner ring having an inner ring race provided on the outer surface thereof;

a plurality of rolling elements provided between the outer ring and the inner ring;

an annular cage for retaining the rolling elements; and seals provided on openings between the respective ends of the inner and outer rings, wherein the cage is made of a synthetic resin material and is supported through the guide of the rolling elements, and wherein the cage includes a plurality of cylindrical pockets arranged peripherally for retaining the rolling elements and a reduced diameter portion formed at ends of the pocket for regulating the radial movement of the cage while being in contact with the rolling element.

According to an eight aspect of the invention, there is provided a spindle device for supporting a spindle for a machine tool by an angular contact ball bearing, the angular contact ball bearing including:

an outer ring having an outer ring race formed on an inner surface thereof;

an inner ring having an inner ring race provided on the outer surface thereof;

a plurality of rolling elements provided between the outer ring and the inner ring;

an annular cage for retaining the rolling elements; and seals provided on openings between the respective ends of the inner and outer rings, wherein the cage is made of a synthetic resin material and is supported through the guide of the rolling elements, and wherein the cage includes a plurality of cylindrical pockets arranged peripherally for retaining the rolling elements and a reduced diameter portion formed at ends of the pocket for regulating the radial movement of the cage while being in contact with the rolling element.

In accordance with the constitution of the invention, a non-contact seal member can inhibit the scattering of the grease accumulated in the bearing. At the same time, the mounting fitting portion on the non-contact seal member and the inner surface of the outer ring can form a grease storing groove. In this arrangement, the base oil (lubricant) can be supplied from the grease accumulated in the grease storing groove into the race on the outer ring.

Further, since the aforementioned grease storing groove is formed by the mounting fitting portion on the non-contact seal member and the inner surface of the outer ring, it is not necessary that a grease storing groove be machined on the inner surface of the outer ring every individual bearing.

In accordance with the angular contact ball bearing of the invention, the cage is supported through the guide of the rolling element with the reduced diameter portion of the cage being in contact with the rolling elements, making it possible to reduce the contact area as compared with the case where the cage is supported guided by the outer ring or the inner ring. Accordingly, the angular contact ball bearing of the invention can difficultly run out of grease upon high speed rotation, inhibiting the self-excited vibration of the cage and hence making it possible to prevent the generation of abnormal noise. Further, the amount of heat generated by friction can be reduced, making it possible to inhibit the temperature rise.

In accordance with the spindle device of the invention, the spindle of machine tools can be supported by the angular contact ball bearing of the invention, making it possible to inhibit the vibration and temperature rise of the spindle even upon high-speed rotation. Accordingly, the machining precision of the machine tools can be enhanced. At the same time, a machine tool spindle having a high stillness can be provided.

DETAILED DESCRIPTION OF THE PREFERRED EMBODIMENTS

The angular contact ball bearing according to embodiments of the invention will be further described hereinafter in connection with the attached drawings.

Figure 1:
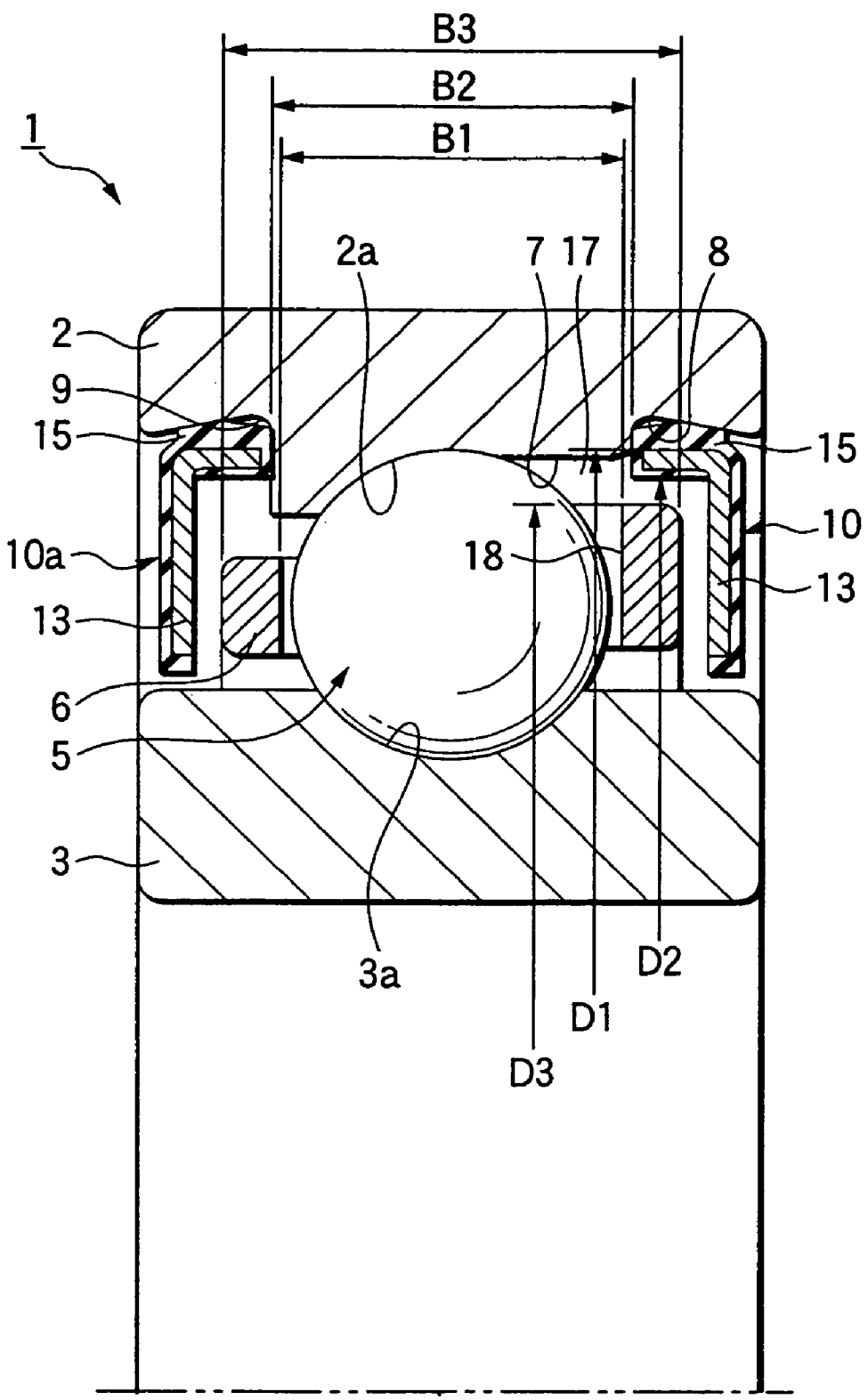
FIG. 1 is a sectional view of essential part illustrating the angular contact ball bearing according to a first embodiment of the invention.

The angular contact ball bearing 1 according to a first embodiment of the invention comprises a plurality of balls 5 disposed as rolling elements between an outer ring race 2a provided on the inner surface of the outer ring 2 and an inner ring race 3a provided on the outer surface of the inner ring 3 as shown in FIG. 1. These balls 5 are retained rollably at peripherally predetermined intervals by a cage 6.

The outer ring 2 has a counterbore 7 formed on the inner surface thereof on one axial end thereof (right side as viewed on the drawing). The cage 6 has a greater outer diameter on the counterbore side than an outer diameter on the side thereof opposite to the counterbore in such an arrangement that the clearance between the outer surface of the cage 6 and the inner surface of the outer ring 2 is almost the same both on the counterbore side thereof and the other side thereof.

Figure 2:
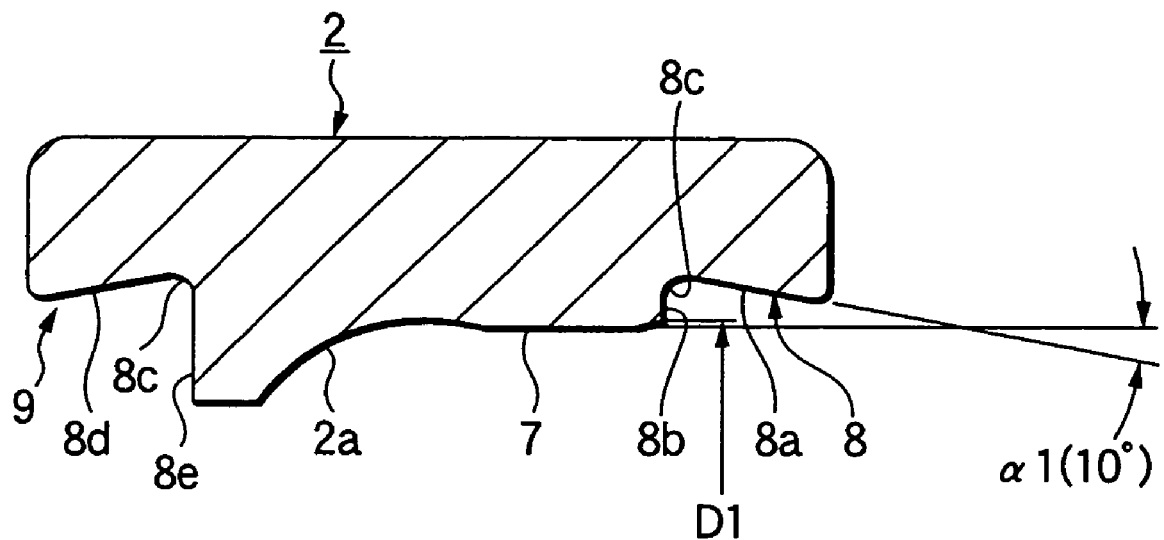
FIG. 2 is an enlarged sectional view of the outer ring shown in FIG. 1.

The outer ring 2 has a pair of first and second seal fitting grooves 8, 9 in the vicinity of both the axial ends of the inner surface thereof in which the first and second non-contact seal members 10, 10a are fitted. As shown in FIG. 2, the first and second seal fitting grooves 8, 9 have first and second tapered inner surfaces 8a, 8d extending obliquely and radially from the end of the outer ring 2 to the interior of the outer ring 2 in the axial direction along with the first non-contact seal 10 on the counterbore side and the second non-contact seal 10a on the side opposite to the counterbore, respectively, and first and second ends 8b, 8e extending continuously from the tapered inner surfaces 8a, 8d inwardly through corners 8c, 8c, respectively. The first end 8b on the counterbore side has a shorter length toward the radial direcction than the second end 8e on the side opposite to the counterbore.

Figure 3:
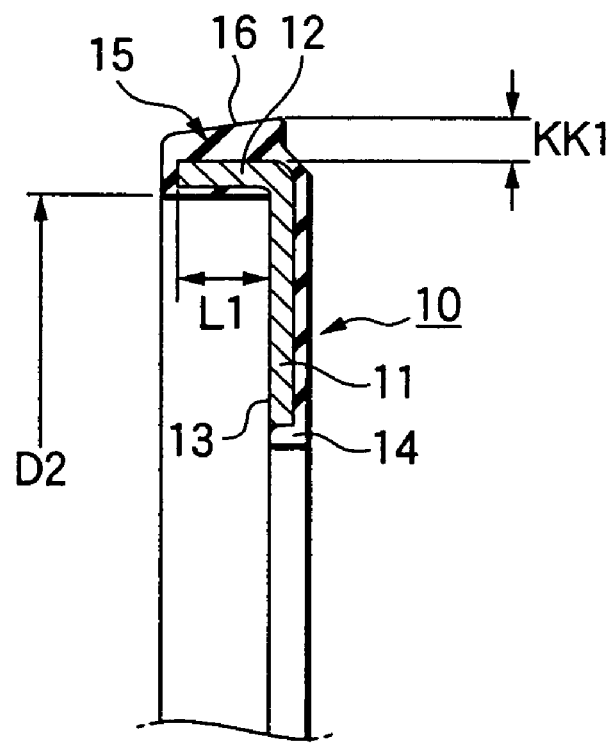
FIG. 3 is an enlarged sectional view of essential part of the non-contact seal member shown in FIG. 1.

Referring to the aforementioned non-contact seal member, the first non-contact seal 10 on the counterbore side thereof and the second non-contact seal 10a on the side opposite to the counterbore have the same shape. As shown in FIG. 3, the non-contact seal member comprises an elastic member 14 such as rubber integrally fixed to a core metal 13 comprising an annular plate 11 and a cylindrical portion 12 extending in the axial direction from the periphery of the annular plate 11 by vulcanization. The inner surface of the elastic member 14 fixed to the annular plate 11 of the core metal 13 is disposed adjacent to the outer surface of the inner ring 3 but does not come in contact with the outer surface of the inner ring 3.

The elastic member 14 fixed to the cylindrical portion 12 of the core metal 13 acts as a mounting fitting portion 15 which is fitted in the seal fitting groove 8 on the outer ring 2. The inner surface of the mounting fitting portion 15 forms the cylindrical inner surface which is almost parallel to the axis. The outer surface of the mounting fitting portion 15 forms a tapered outer surface 16 extending obliquely inwardly to reduce in radius along the protruding direction of the cylindrical portion 12.

When the mounting fitting portion 15 is fitted in the first and second seal fitting grooves 8, 9, the tapered outer surface 16 extends obliquely in the direction opposite to the slope of the tapered inner surfaces 8a, 8d, respectively.

The non-contact seal members 10, 10a which are inserted and fitted into the seal fitting grooves 8, 9 in the axial direction, respectively, have an outer diameter smaller at the forward end of insertion (protruding side of the cylindrical portion 12) of the mounting fitting portion 15 than on the rear end of insertion and thus can be easily fitted in and difficultly released from the seal fitting grooves 8, 9, respectively.

The outer diameter of the cylindrical portion 12 of the core metal 13 in the aforementioned non-contact seal member 10, 10a each are greater than the minimum inner diameter D1 of the first seal fitting groove 8 on the counterbore side thereof. When the mounting fitting portion 15 is fitted in the first seal fitting groove 8, the non-contact seal member 10, 10a each act as an axial direction positioning means for preventing the mounting fitting portion 15 from being inserted in the axial direction more than required.

In order to prevent the first non-contact seal member 10 from being released due to the shallowness of the first seal fitting groove 8 on the counterbore side thereof, the taper angle α1 of the tapered inner surfaces 8a, 8d of the seal fitting grooves 8, 9, respectively, is preferably from 1 to 30 degrees. In the present embodiment, the taper angle α1 is 10 degrees.

When the taper angle α1 exceeds 30 degrees, the depth of the first seal fitting groove 8 is too great, reducing the thickness of the outer ring 2 and hence making it likely that the strength of the outer ring 2 can be reduced. On the contrary, when the taper angle α1 is less than 1 degree, the fitting force of the first non-contact seal member 10 can be greatly varied depending on the machining precision of the first seal fitting groove 8.

Further, in the present embodiment, the inner diameter D2 of the mounting fitting portion 15 of the first non-contact seal member 10 is predetermined smaller than the minimum inner diameter D1 of the first seal fitting groove 8 on the corresponding counterbore side thereof and greater than the maximum outer diameter D3 of the cage 6. Further, the gap B2 between the pair of the first and second seal fitting grooves 8, 9 is predetermined not smaller than the diameter B1 of the pocket of the cage 6 and not greater than the width B3 of the cage 6.

In other words, by predetermining the inner diameter D2 of the mounting fitting portion 15 of the first non-contact seal member 10 not greater than the minimum inner diameter D1 of the first seal fitting groove 8 on the counter bore side thereof, the axially inward forward end of the mounting fitting portion 15 and the counterbore 7 can form a grease storing groove 17 on the inner surface of the outer ring 2. Further, by predetermining the inner diameter D2 of the mounting fitting portion 15 greater than the maximum outer diameter D3 of the cage 6, abnormal heat generation or damage by interference between the cage 6 and the mounting fitting portion 15 can be prevented.

Moreover, by predetermining the gap B2 between the pair of the first and second seal fitting grooves 8, 9 not smaller than the diameter B1 of the pocket 18 of the cage 6, the side surface of the grease storing groove 17 along the axial direction (axially inward forward end of the mounting fitting portion 15) is disposed axially outside the inner surface of the pocket 18. In this arrangement, when the grease scooped by the balls 5 which are rolling passes through the pocket 18 to the inner surface of the outer ring 2, it is assured that the grease can be stored in the grease storing groove 17.

The reason why the gap B2 between the pair of the first and second seal fitting grooves 8, 9 is predetermined to not greater than the width B3 of the cage 6 will be described below.

As mentioned above, the grease storing groove 17 formed in the inner surface of the outer ring 2 by the axially inward forward end of the mounting fitting portion 15 and the counterbore 7 can exert its effect more as it is disposed closer to the outer ring race 2a because the base oil oozed from the grease accumulated in the grease storing groove 17 lubricates the outer ring race 2a.

Further, when the axial width of the grease storing groove 17 is too great, the amount of grease encapsulated in the bearing increases, causing torque rise. It is thus preferred that the axial width of the grease storing groove 17 be reduced close to the diameter B1 of the pocket of the cage 6 to reduce the encapsulated amount of grease as much as possible.

In accordance with the aforementioned angular contact ball bearing 1 according to the present embodiment, the scattering of the grease accumulated in the bearing can be inhibited by the pair of the first and second non-contact seal members 10, 10a. Further, the mounting fitting portion 15 of the first non-contact seal member 10 and the inner surface of the outer ring 2 can form the grease storing groove 17. In this arrangement, the base oil (lubricant) can be supplied from the grease accumulated in the grease storing groove 17 into the outer ring race 2a on the outer ring 2.

Accordingly, the grease accumulated in the bearing is allowed to make sufficient contribution to lubrication even upon rotation of dmN (permissible rotating speed) of 1,000,000 or more, making it possible to provide the bearing with a prolonged life during high speed rotation.

Moreover, since the grease storing groove 17 is formed by the mounting fitting portion 15 of the first non-contact seal member 10 and the inner surface of the outer ring 2, it is not necessary that a grease storing groove be machined on the inner surface of the outer ring every individual bearing, causing no rise of the production cost of the bearing.

While the aforementioned embodiment has been described with reference to the case where the shape of the first and second seal fitting grooves 8, 9 and the first and second non-contact seal members 10, 10a are the same, the angular contact ball bearing of the invention is not limited thereto. For example, the shapes of the seal fitting groove and the non-contact seal member may differ from on the counterbore side to the side opposite to the counterbore. For the recognition's sake, the color of the non-contact seal member may differ from on the counterbore side to the side opposite to the counterbore.

The angular contact ball bearing according to a second embodiment of the invention will be described hereinafter in connection with FIGS. 4 to 6. The angular contact ball bearing 21 according to the second embodiment differs from the angular contact ball bearing 1 according to the first embodiment only in the shape of the second seal fitting groove 28 on the side opposite to the counterbore and the second non-contact seal member 30 fitted in the second seal fitting groove 28. Therefore, where the parts function in the same way as those of the first embodiment, the same reference numbers are used and detailed description is omitted.

Figure 4:
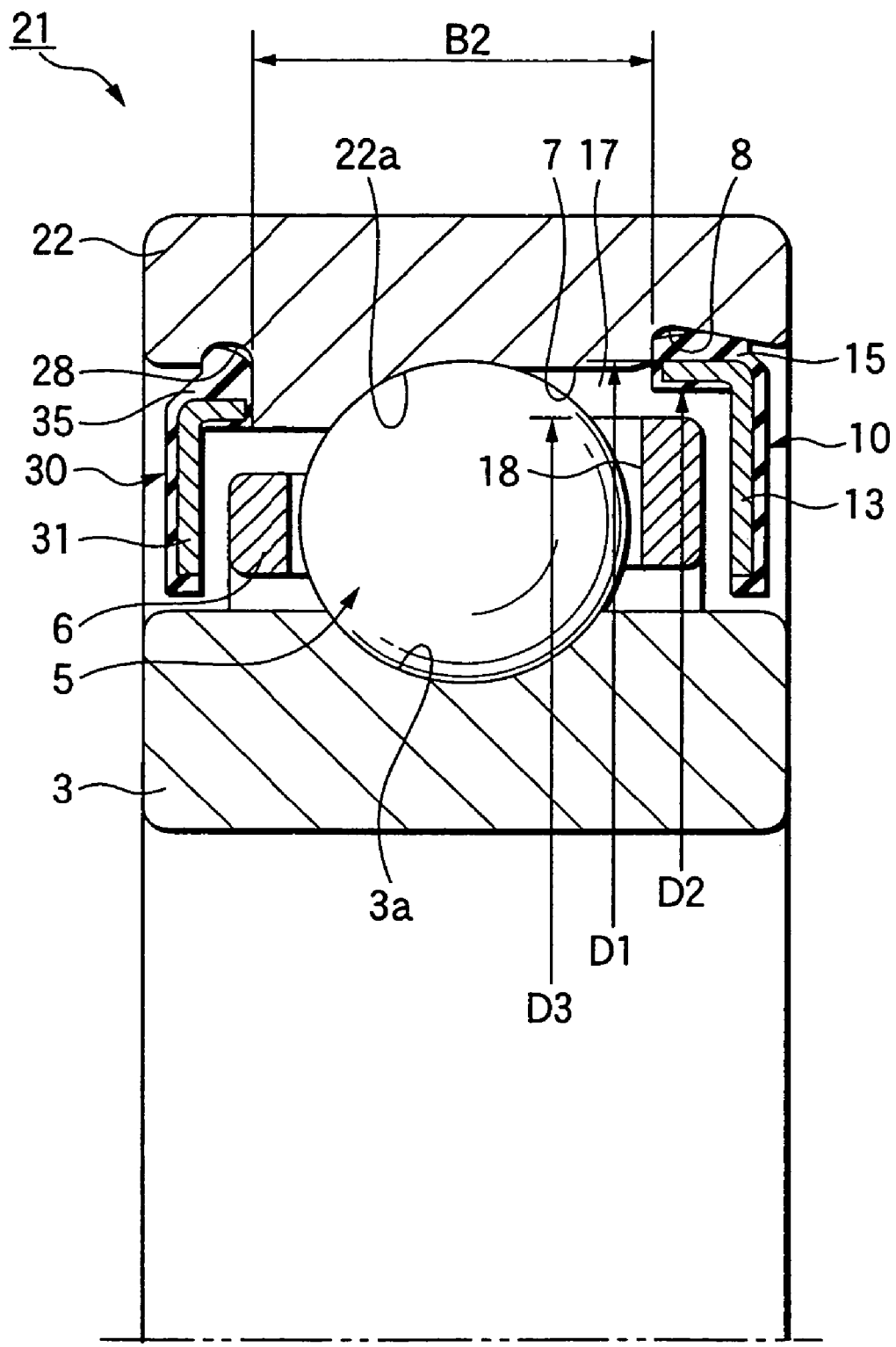
FIG. 4 is an enlarged sectional view of essential part illustrating the angular contact ball bearing according to a second embodiment of the invention.
Figure 5:
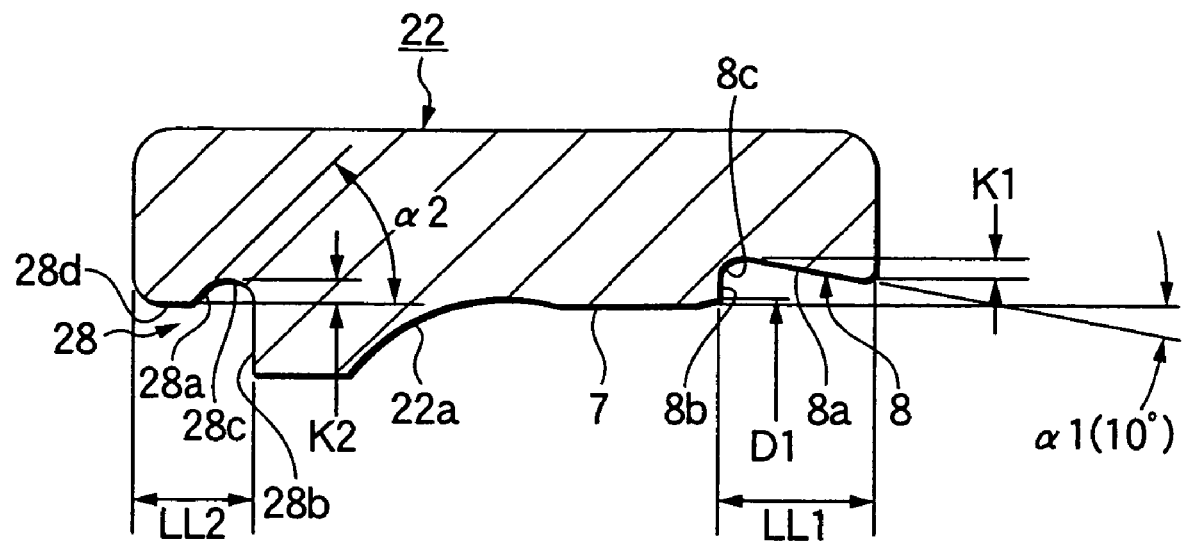
FIG. 5 is an enlarged sectional view of the outer ring shown in FIG. 4.

As shown in FIGS. 4 and 5, the angular contact ball bearing 21 according to the second embodiment comprises a second seal fitting groove 28 on the side thereof opposite to the counterbore having a second cylindrical surface 28d extending substantially parallel to the axis from the end of the outer ring 22 axially inwardly, a second tapered inner surface 28a extending continuously from the second cylindrical surface 28d obliquely and radially to increase in radius, and a second end 28b extending downward from the second tapered inner surface 28a through a corner 28c. The first end 8b on the counterbore side thereof has a smaller radial length than the second end 28b on the side opposite to the counterbore.

Figure 6:
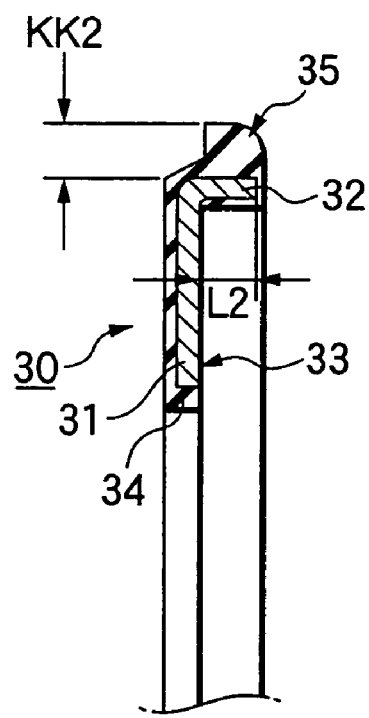
FIG. 6 is an enlarged sectional view of essential part of the non-contact seal member on the side opposite to the counterbore shown in FIG. 4.

As shown in FIG. 6, the second non-contact seal member 30 comprises an elastic material 34 such as rubber integrally fixed to a core metal 33 comprising an annular plate 31 and a cylindrical portion 32 extending in the axial direction from the periphery of the annular plate 31 by vulcanization. The inner surface of the elastic material 34 fixed to the annular plate 31 of the core metal 33 is disposed adjacent to the outer surface of the inner ring 3 but does not come in contact with the outer surface of the inner ring 3. In the present embodiment, the inner surface of the elastic material 34 forms a cylindrical surface parallel to the axis.

The elastic material 34 fixed to the cylindrical portion 32 of the core metal 33 forms a mounting fitting portion 35 which is fitted in the second seal fitting groove 28 of the outer ring 22. The inner surface of the mounting fitting portion 35 forms a cylindrical inner surface substantially parallel to the axis. The outer surface of the mounting fitting portion 35 forms a curved outer surface having a section of quarter arc which gradually reduces in radius along the protruding direction of the cylindrical portion 32.

In this arrangement, when the second non-contact seal member 30 is axially inserted and fitted in the second seal fitting groove 28, it can be easily fitted in and difficultly released from the second seal fitting groove 28 because the mounting fitting portion 35 has an outer diameter smaller at the forward end of insertion (protruding side of the cylindrical portion 32) than at the rear end of insertion.

As shown in FIG. 5, in the second embodiment, the depth K1 of the first seal fitting groove 8 on the counterbore side thereof is lower than the depth K2 of the second seal fitting groove 28 on the side thereof opposite to the counterbore (K1<K2), assuring that the outer ring 22 has a sufficient thickness on the counterbore side thereof and hence preventing the drop of the strength of the outer ring 22.

Further, since the first seal fitting groove 8 on the counterbore side thereof is tapered so that the depth thereof is low, the axial length LL1 of the first seal fitting groove 8 is predetermined longer than the axial length LL2 of the second seal fitting groove 28 on the side thereof opposite to the counterbore (LL1≧LL2) to assure that the axial positioning of the first non-contact seal member 10 can be easily made by the core metal 11 of the first non-contact seal member 10 and the end 8b of the first seal fitting groove 8 as shown in FIG. 3.

Consequently, as shown in FIGS. 3 and 6, the maximum thickness KK1 of the elastic member 14 fixed to the cylindrical portion 12 of the core metal 13 in the first non-contact seal member 10 on the counterbore side thereof is predetermined lower than the maximum thickness KK2 of the elastic material 34 fixed to the cylindrical portion 32 of the core metal 33 in the second non-contact seal member 30 on the side thereof opposite to the counterbore (KK1<KK2). Further, the axial length L1 of the cylindrical portion 12 of the core metal 11 in the first non-contact seal member 10 is predetermined longer than the axial length L2 of the cylindrical portion 32 of the core metal 31 in the second non-contact seal member 30 (L1≧L2).

In this arrangement, the tension of the mounting fitting portion 15 of the first non-contact seal member 10 on the counterbore side thereof is higher than the tension of the mounting fitting portion 35 of the second non-contact seal member 30 on the side thereof opposite to the counterbore so that the first non-contact seal member 10 can be difficultly released in the axial direction.

Further, as shown in FIG. 5, the oblique angle $\alpha 2$ of the second tapered inner surface 28a in the second seal fitting groove 28 on the side thereof opposite to the counterbore is predetermined greater than the taper angle $\alpha 1$ of the first tapered inner surface 8a in the first seal fitting groove 8 on the counterbore side thereof ($\alpha 1 < \alpha 2$).

The reason why the oblique angle $\alpha 2$ of the second tapered inner surface 28a in the second seal fitting groove 28 on the side thereof opposite to the counterbore is predetermined greater than the taper angle $\alpha 1$ of the first tapered inner surface 8a in the first seal fitting groove 8 on the counterbore side thereof is that the outer ring 22 can be provided with a sufficient thickness to provide the second seal fitting groove 28 with a sufficient depth K2.

The other constitutions and effects of the angular contact ball 21 bearing according to the second embodiment are the same as that of the angular contact ball bearing 1 according to the first embodiment and the description thereof will be omitted.

The angular contact ball bearing according to a third embodiment of the invention will be described in connection with FIGS. 7 to 9. The angular contact ball bearing 23 according to the third embodiment differs from the angular contact ball bearing 21 according to the second embodiment only in the shape of the first seal fitting groove 38 on the counterbore side thereof and the first non-contact seal member 40 fitted in the first seal fitting groove 38. Therefore, where the parts function in the same way as those of the second embodiment, the same numbers are used and detailed description is omitted.

Figure 7:
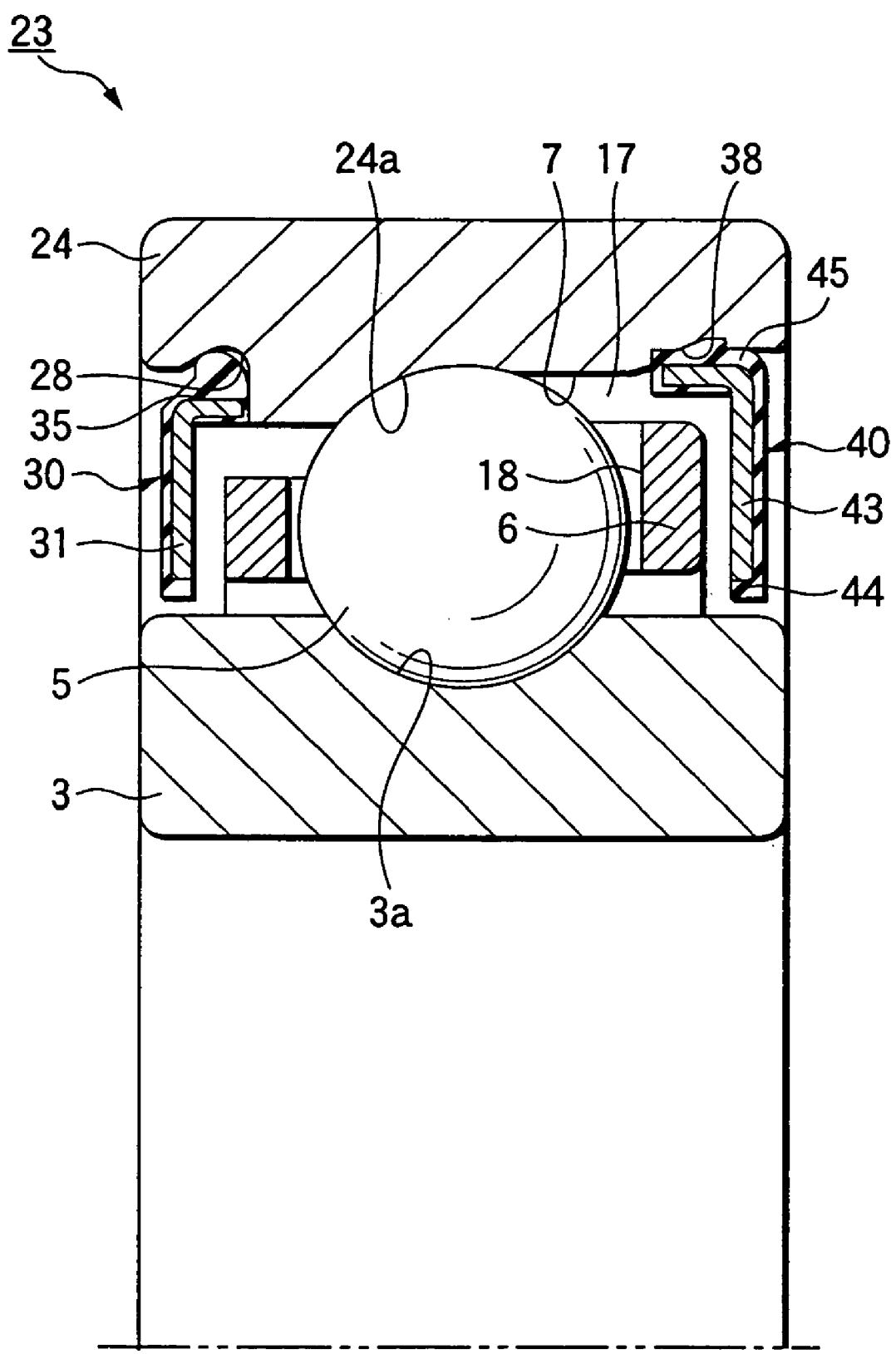
FIG. 7 is a sectional view of essential part illustrating the angular contact ball bearing according to a third embodiment of the invention.
Figure 8:
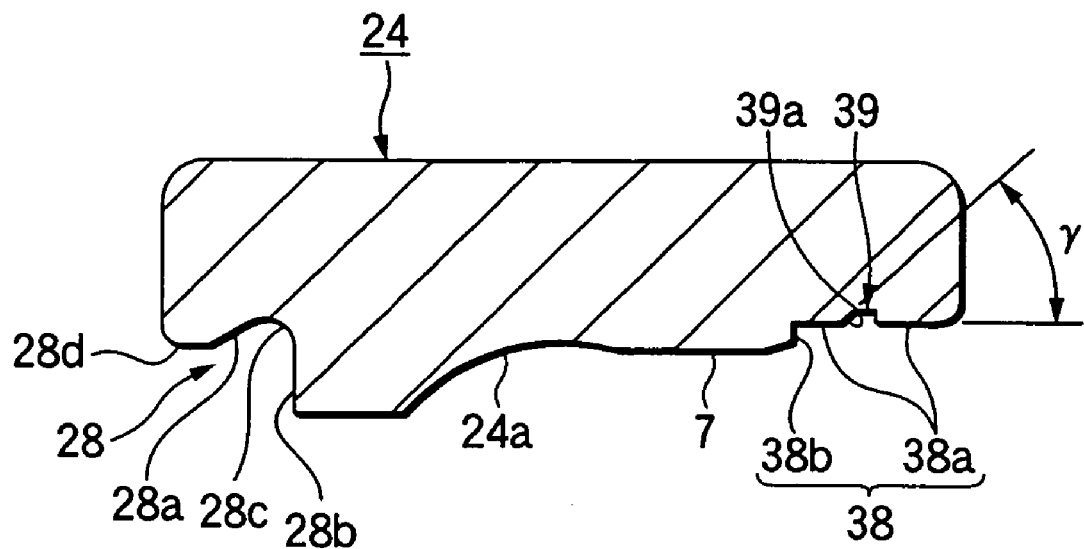
FIG. 8 is an enlarged sectional view of the outer ring shown in FIG. 7.

As shown in FIGS. 7 and 8, the angular contact ball bearing 23 according to the third embodiment comprises a first seal fitting groove 38 on the counterbore side thereof having a first cylindrical surface 38a extending substantially parallel to the axis from the end of the outer ring 24 axially inwardly, a first end 38b extending continuously from the first cylindrical surface 38a radially and inwardly, and a peripheral groove 39 formed on the first cylindrical surface 38a. The first end 38b on the counterbore side thereof has a smaller radial length than the second end 28b on the side opposite to the counterbore.

As shown in FIG. 8, the inner side surface of the peripheral groove 39 forms a tapered side surface 39a extending inwardly of the outer ring 24 toward the axis obliquely at a predetermined angle $\gamma$ to reduce in radius.

Figure 9:
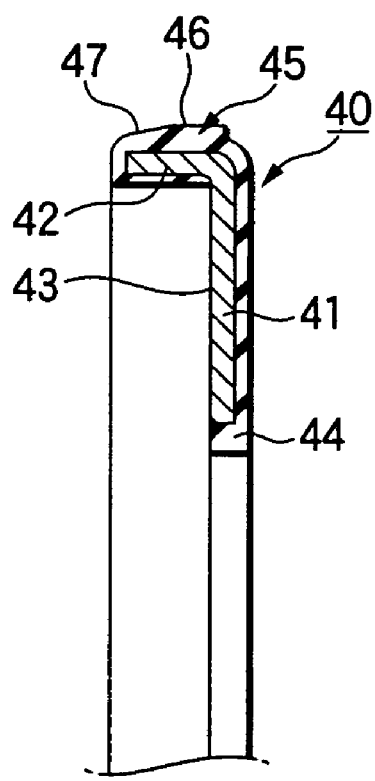
FIG. 9 is an enlarged sectional view of essential part of the non-contact seal member on the counterbore side shown in FIG. 7.

As shown in FIG. 9, the first non-contact seal member 40 comprises an elastic material 44 such as rubber integrally fixed to a core metal 43 comprising an annular plate 41 and a cylindrical portion 42 extending in the axial direction from the periphery of the annular plate 41 by vulcanization. The inner surface of the elastic material 44 fixed to the annular plate 41 of the core metal 43 is disposed adjacent to the outer surface of the inner ring 3 but does not come in contact with the outer surface of the inner ring 3.

The elastic material 44 fixed to the cylindrical portion 42 of the core metal 43 acts as a mounting fitting portion 45 which is fitted in the first seal fitting groove 38 on the outer ring 24. The inner surface of the mounting fitting portion 45 forms the cylindrical inner surface which is almost parallel to the axis. The outer surface of the mounting fitting portion 45 is formed by a cylindrical outer surface 46 extending almost parallel to the axis and a tapered outer surface 47 extending obliquely inwardly to reduce in radius toward the protruding direction of the cylindrical portion 42.

In this arrangement, when the first non-contact seal member 40 is inserted and fitted in the first seal fitting groove 38 in the axial direction, it can be easily fitted in and difficultly released from the first seal fitting groove 38 because the mounting fitting portion 45 has an outer diameter smaller at the forward end of insertion (protruding side of the cylindrical portion 42) than at the rear end of insertion.

Further, since the outer diameter of the cylindrical outer surface 46 of the mounting fitting portion 45 is greater than the inner diameter of the first cylindrical surface 38a of the first seal fitting groove 38, the mounting fitting portion 45 is pressed against the first cylindrical surface 38a of the first seal fitting groove 38 while the elastically deformed cylindrical outer surface 46 being partly inserted in the peripheral groove 39 and thus can be more difficultly released therefrom.

The other constitutions and effects of the angular contact ball 23 bearing according to the third embodiment are the same as that of the angular contact ball bearing 21 according to the second embodiment and the description thereof will be omitted.

The angular contact ball bearing according to a fourth embodiment will be described hereinafter in connection with FIG. 10. The angular contact ball bearing 25 according to the fourth embodiment is the same as the angular contact ball bearing 21 according to the second embodiment in basic constitution except in that the shape of the second seal fitting groove 58 on the side thereof opposite to the counterbore and the second non-contact seal member 60 fitted in the second seal fitting groove 58 differ from that of the angular contact ball bearing 21 according to the second embodiment and the outer diameter of the cage 70 is the same both on the counterbore side and on the side opposite to the counterbore. Thus, where the parts function in the same way as those of the second embodiment, the same numbers are used and detailed description is omitted.

Figure 10:
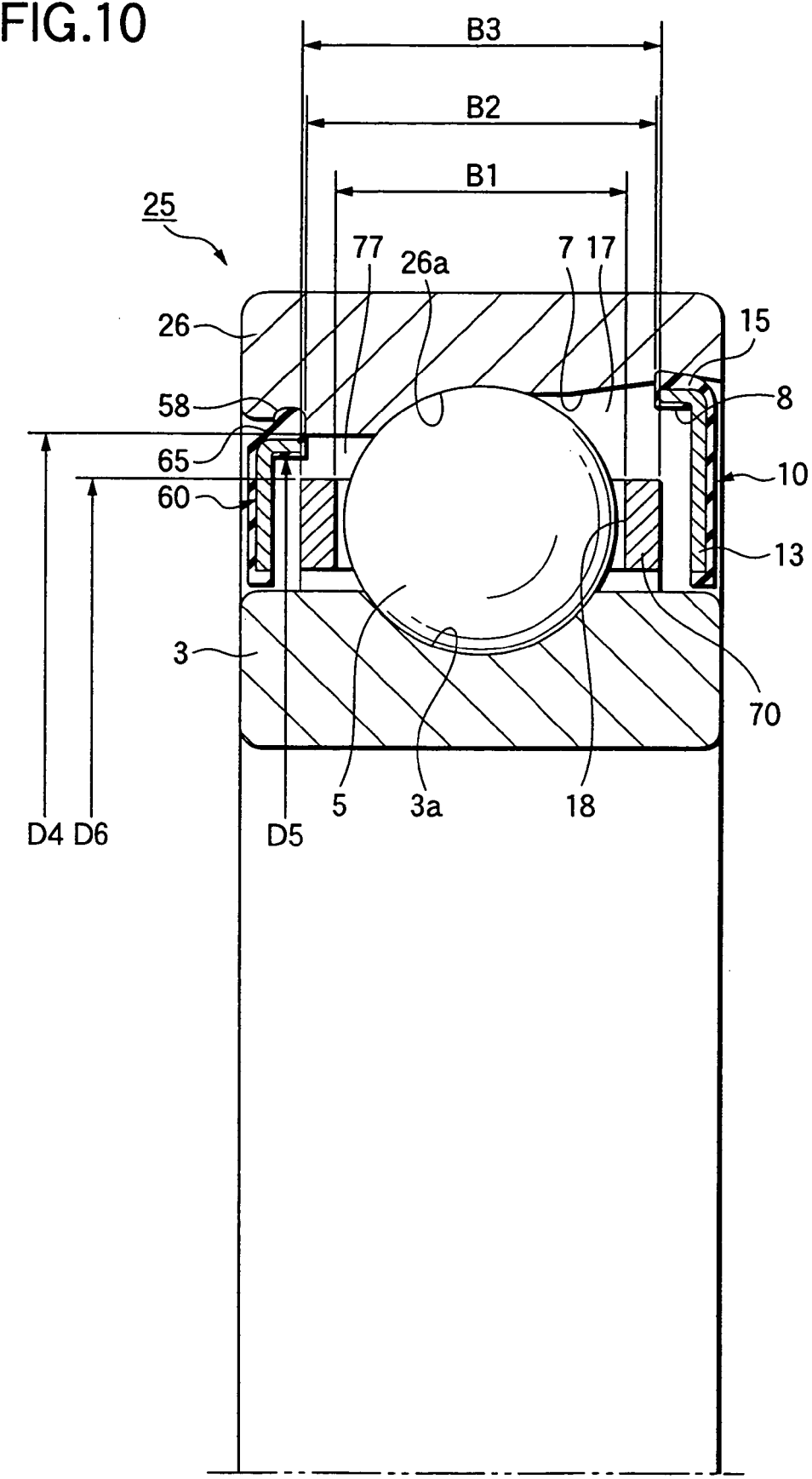
FIG. 10 is a sectional view of essential part illustrating the angular contact ball bearing according to a fourth embodiment of the invention.

As shown in FIG. 10, the angular contact ball bearing 25 according to the fourth embodiment comprises a second seal fitting groove 58 on the side thereof opposite to the counterbore having a minimum inner diameter D4 greater than the minimum inner diameter of the second seal fitting groove 28 in the second embodiment. Further, the outer diameter of the second non-contact seal member 60 fitted in the second seal fitting groove 58 is smaller than the outer diameter of the second non-contact seal member 30 in the second embodiment and the mounting fitting portion 65 has the same shape as that of the mounting fitting portion 35 in the second embodiment.

Further, the inner diameter D5 of the mounting fitting portion 65 of the second non-contact seal member 60 is predetermined not greater than the minimum inner diameter D4 of the second seal fitting groove 58 on the side thereof opposite to the counterbore and not smaller than the maximum outer diameter D6 of the cage 70. Moreover, the gap B2 between the first and second seal fitting grooves 8, 58 is predetermined to be not smaller than the diameter B1 of the pocket of the cage 70 and not greater than the width B3 of the cage 70.

In other words, by predetermining the inner diameter D5 of the mounting fitting portion 65 in the second non-contact seal member 60 smaller than the minimum inner diameter D4 of the second seal fitting groove 58 on the side thereof opposite to the counterbore, the axially inward forward end of the mounting fitting portion 65 and the inner surface of the outer ring 26 can form a grease storing groove 77 also on the inner surface of the outer ring on the side thereof opposite to the counterbore. In this arrangement, a large amount of grease from the grease storing groove 17 on the counterbore side and the grease storing groove 77 on the side thereof opposite to the counterbore can be encapsulated also in the bearing depending on the working atmosphere.

The other constitutions and effects of the angular contact ball 25 bearing according to the fourth embodiment are the same as that of the angular contact ball bearing 21 according to the second embodiment and the description thereof will be omitted.

It goes without saying that the constitution of the core metal of the first and second non-contact seal members, the mounting fitting portion, the seal fitting groove, the cage, etc. in the angular contact ball bearing of the invention is not limited to that of the aforementioned various embodiments but may be in various forms according to the scope of the invention.

Figure 11:
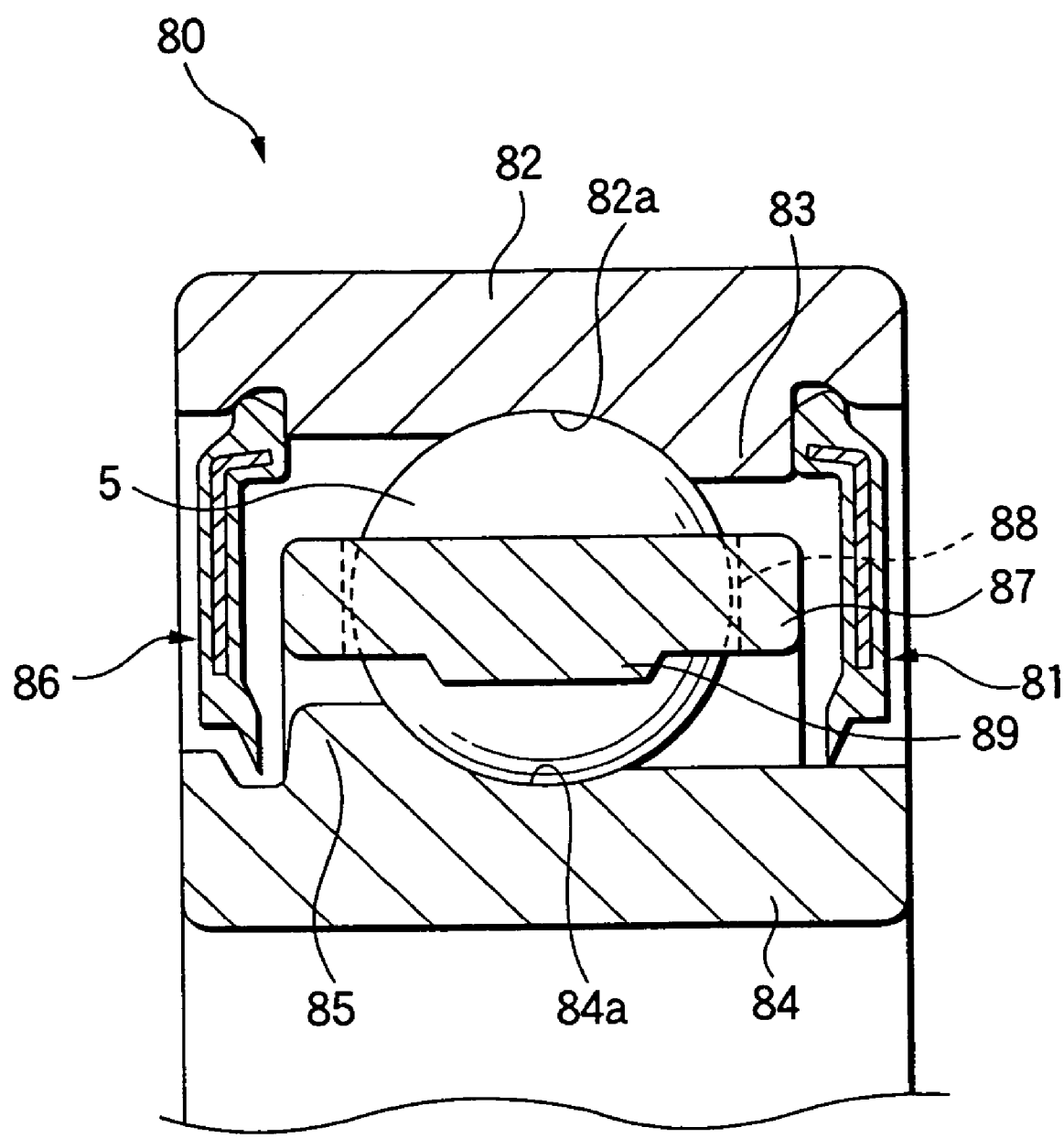
FIG. 11 is an enlarged sectional view of essential part illustrating the angular contact ball bearing according to a fifth embodiment of the invention.
Figure 12:
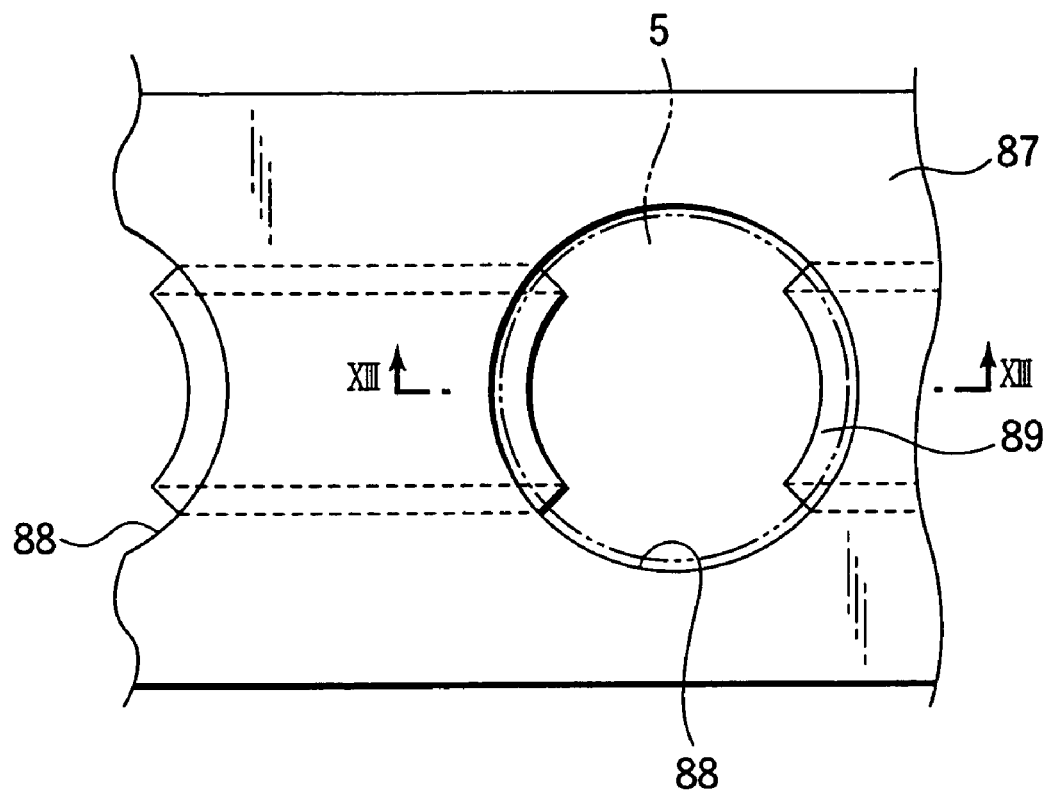
FIG. 12 is a partial plan view of the cage shown in FIG. 11 as viewed externally.
Figure 13:
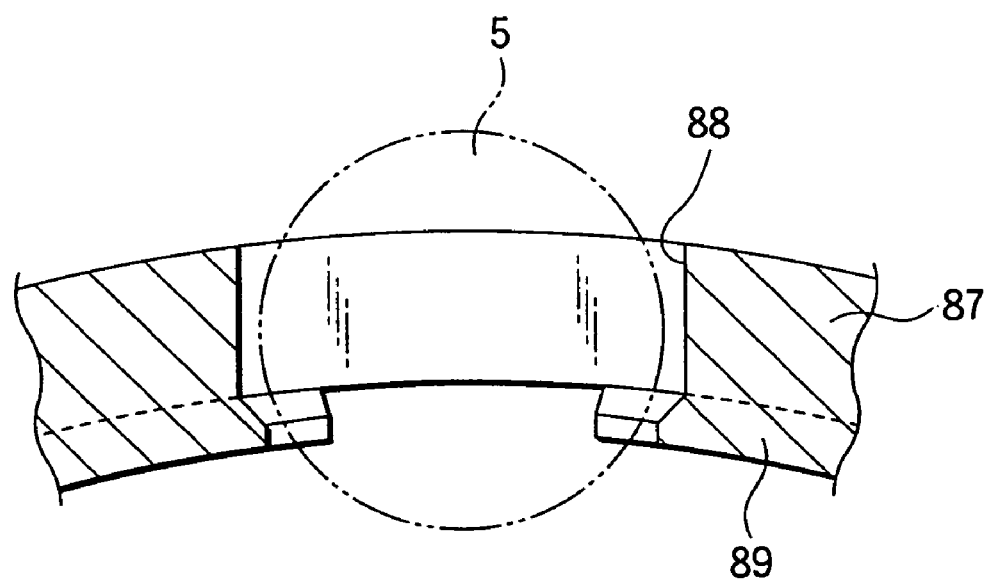
FIG. 13 is a partial sectional view of the cage of FIG. 12 taken in line XIII—XIII.
Figure 14:
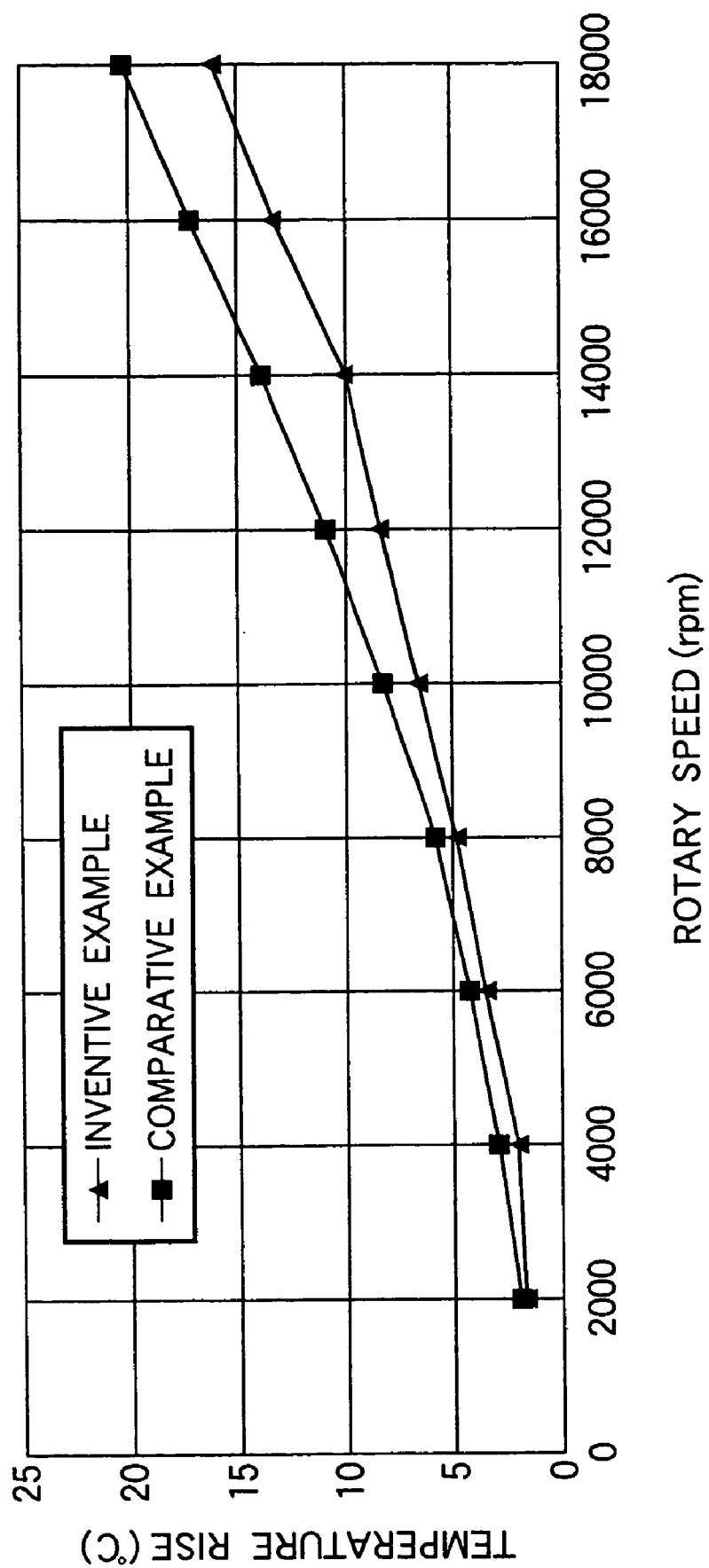
FIG. 14 is a line graph illustrating the results of comparative test on temperature rise.

The fifth embodiment of the angular contact ball bearing according to the invention will be described hereinafter in connection with FIGS. 11 to 13. FIG. 11 is a sectional view of essential part illustrating the fifth embodiment of the angular contact ball bearing according to the invention. FIG. 12 is a partial plan view of the cage shown in FIG. 11 as viewed externally. FIG. 13 is a partial sectional view of the cage of FIG. 12 taken in line XIII—XIII. FIG. 14 is a line graph illustrating the results of comparative test on temperature rise.

As shown in FIG. 11, the angular contact ball bearing 80 comprises an outer ring 82 having an outer ring race 82a formed on the inner surface thereof, an inner ring 84 having an inner ring race 84a formed on the outer surface thereof and a plurality of steel balls 5 disposed as rolling elements between the outer ring race 82a on the outer ring 82 and the inner ring race 84a on the inner ring 84. The plurality of balls 5 are retained at peripheral intervals by an annular cage 87 disposed between the inner surface of the outer ring 82 and the outer surface of the inner ring 84. Further, seals 81, 86 are mounted on the opening of both the outer ring 82 and inner ring 84.

A shoulder portion 83 is formed at one side of the outer ring race 82a on the inner surface of the outer ring 82. On the outer surface of the inner ring 84 is formed a shoulder portion 85 symmetrically with the shoulder portion 83 of the outer ring 82 about the ball 5. By thus providing the outer ring 82 and the inner ring 84 with the shoulder portions 83 and 85, respectively, the angular contact ball bearing 80 can receive the radial load as well as the axial load.

The seals 81, 86 are of non-contact type and are mounted on the outer ring 82 in the vicinity of the both ends of the inner surface thereof, respectively. The seals 81, 86 each are formed annually by a rubber and comprise an annular metal plate incorporated therein to stabilize the shape thereof upon high speed rotation.

As shown in FIGS. 11 to 13, the cage 87 is formed annually by a synthetic resin and has a plurality of cylindrical pockets 88 disposed peripherally for receiving and retaining the balls 5. The inner diameter of the pocket 88 is predetermined slightly greater than the diameter of the ball 5.

As the "synthetic resin" there may be used a material comprising as a matrix Polyamide 66, Polyamide 46, polyphenylene sulfide, thermoplastic polyimide, polyether ether ketone or the like. In order to enhance the strength of the cage, the synthetic resin material preferably comprises glass fiber incorporated therein in an amount of from 10 to 40% by weight or carbon fiber or aramide fiber incorporated therein in an amount of from 10 to 30% by weight. In order to meet the requirements for high speed rotation, carbon fiber or aramide fiber is preferred. However, glass fiber can be used depending on the purpose. When the added amount of carbon fiber or aramide fiber falls below 10% by weight, the resulting cage cannot maintain the desired strength sufficiently. When the added amount of carbon fiber or aramide fiber exceeds 30% by weight, the resulting synthetic resin exhibits a deteriorated formability that deteriorates the external appearance of the cage. More preferably, the added amount of carbon fiber or aramide fiber ranges from 20 to 30% by weight to provide a synthetic resin excellent in strength and moldability. The added amount of glass fiber is more preferably from 10 to 40% by weight. The reason for this restriction is the same as that for carbon fiber or aramide fiber.

The outer diameter of the cage 87 is smaller than the inner diameter of the shoulder portion 83 of the outer ring 82. The inner diameter of the cage 87 is formed greater than the outer diameter of the shoulder portion 85 of the inner ring 84. Further, the inner diameter of the pocket 88 is formed slightly greater than the outer diameter of the ball 5.

A reduced diameter portion 89 extending toward the interior of the pocket 88 is formed on the inner surface of the cage 87. The reduced diameter portion 89 is provided at two opposing points along the periphery of the cage 87 inside the respective pockets 88. Further, the reduced diameter portion 89 forms a tapered surface extending continuously from the pocket 88 and regulates the radial movement of the cage 87 while being in contact with the balls 5. Moreover, the reduced diameter portion 89 extends in the form of band peripherally between the adjacent pockets 88, 88 for the sake of molding of the reduced diameter portion 89.

The balls 5 are each supplied with a grease to lubricate the races 82*a* and 84*a* of the outer ring 82 and the inner ring 84, respectively, the pocket 88 of the cage 87 and the reduced diameter portion 89 with balls 5. In this arrangement, the angular contact ball bearing 80 can be prevented from undergoing seizing and generating vibration and abnormal noise.

As mentioned above, the angular contact ball bearing 80 according to the present embodiment is an angular contact ball bearing comprising a cage 87 made of a synthetic resin and seals 81, 86. The cage 87 is supported through the guide of the balls 5 as rolling elements. In this arrangement, the contact area can be reduced at the time of rotation of bearing as compared with the case where the cage is supported through the guide of the outer ring 82 or the inner ring 84. Accordingly, the angular contact ball bearing of the invention can difficultly run out of grease upon high speed rotation, inhibiting the self-excited vibration of the cage 87 and hence making it possible to prevent the generation of abnormal noise. Further, the amount of heat generated by friction can be reduced, making it possible to inhibit the temperature rise of the bearing 80.

The results of test for comparison of temperature rise upon rotation on a comparative example wherein the cage in the sealed angular contact ball bearing according to the fifth embodiment is guided by the outer ring as conventional and an inventive example wherein the cage in the sealed angular contact ball bearing according to the fifth embodiment is guided by the rolling elements according to the present invention will be given below.

As an angular contact ball bearing there was used one obtained by providing 7008CTYDB with a seal on both sides thereof both for the comparative example and the inventive example. As the cage for the comparative example there was used a cage made of phenolic resin guided by an outer ring. As the cage for the inventive example there was used a cage made of polyamide 66 nylon guided by rolling elements. As the lubricant there was used a grease (Isoflex NBU15). The encapsulated amount of the grease was 15% of the free internal space of the bearing. The rotating speed of the bearing tested was from 2,000 to 18,000 rpm. The temperature rise was measured every 2,000 rotations.

The results of the comparison test are shown in FIG. 14. Among the two lines, one shown by triangle indicates the inventive example and one shown by rectangle indicates the comparative example.

The results of the comparison test show that the inventive example shows a lowered temperature rise as compared with the comparative example over a rotating speed range of from 2,000 to 18,000 rpm. In particular, when the angular contact ball bearing operates at a speed as high as 18,000 rpm, the inventive example shows a temperature rise of about 4° C. lower than the comparative example. This demonstrates that the inventive example exerts an effect of reducing the heat generation by about 20% from the comparative example.

It was confirmed from these results that the use of a cage guided by rolling elements makes it possible to reduce the heat generation of a sealed angular contact ball bearing as compared with the conventional case.

Figure 15:
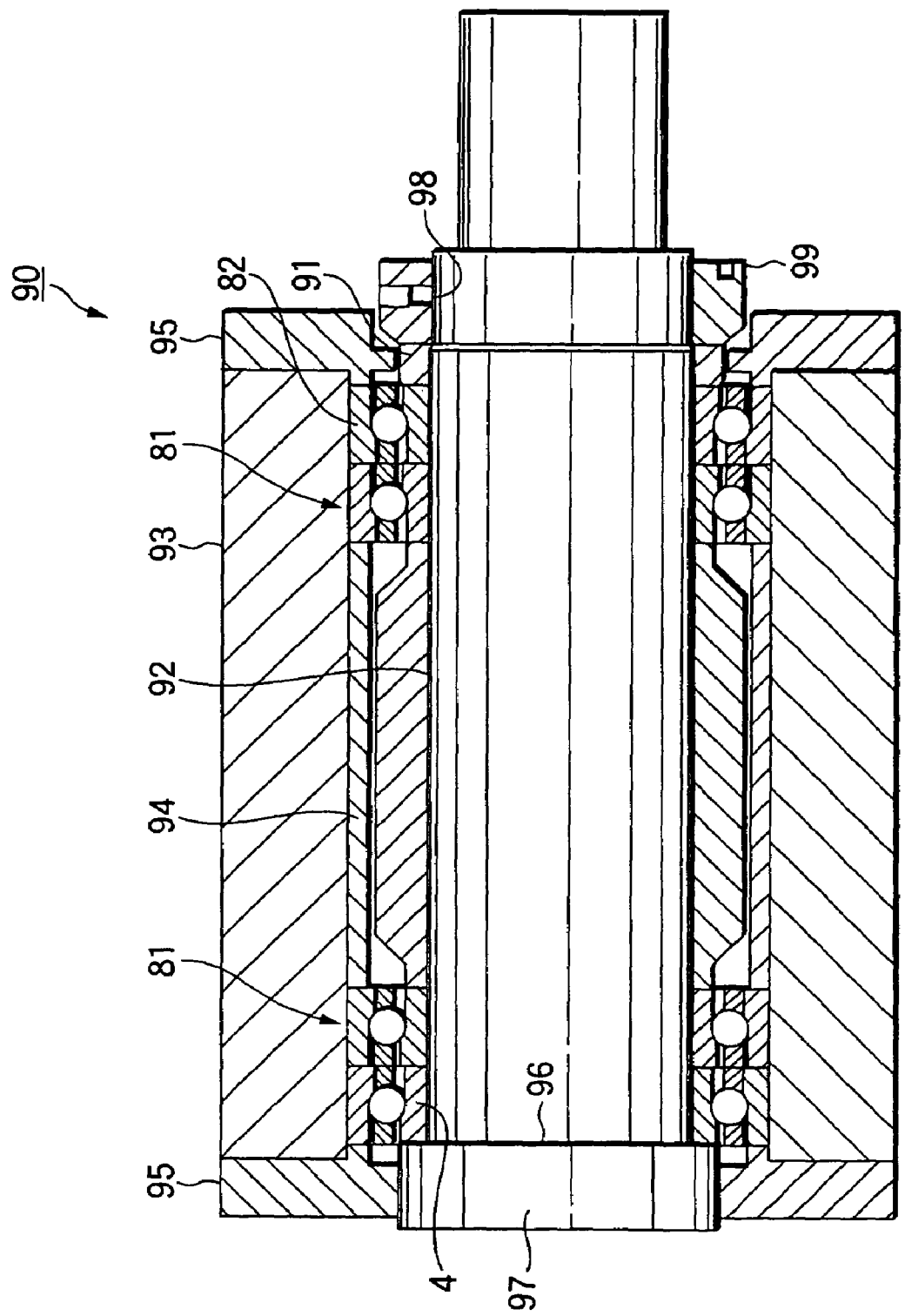
FIG. 15 is a sectional view illustrating an embodiment of the spindle device of the invention.
Figure 16:
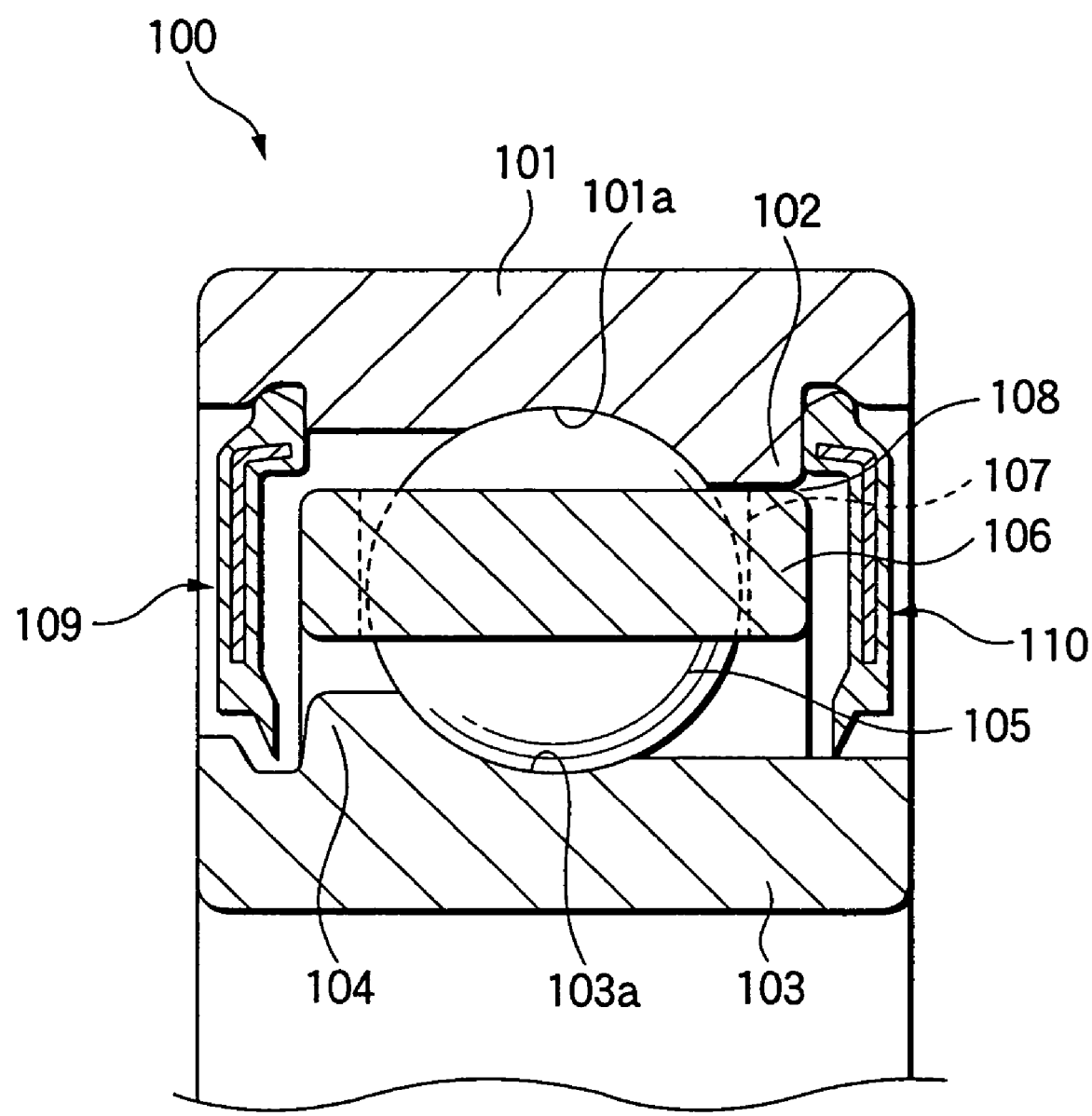
FIG. 16 is a sectional view of essential part illustrating the conventional angular contact ball bearing.

An embodiment of the spindle device according to the invention will be described hereinafter in connection with FIG. 15. FIG. 15 is a sectional view illustrating an embodiment of the spindle device of the invention.

The spindle device 90 according to the present embodiment is used for machine tools. The spindle for cutting 92 is supported on a housing 93 at the forward and rear ends thereof by bearings 81 arranged in a double row. These bearings 81 each are the same as the angular contact ball bearing 80 shown as an embodiment of the angular contact ball bearing according to the invention. Two double-rows of these bearings 81 are arranged back-to-back (DBB combination).

The inner surface of the housing 93 forms a cylindrical surface. The outer rings 82 of these bearings 81 are fixedly interposed between a pair of bolted fastening rings 95 disposed on the respective ends of the housing 93 together with the respective outer ring seats 94. The spindle 92 has a large diameter portion 97 formed on one end thereof via a stepped surface 96 (contact surface with the bearing 81 disposed leftmost as viewed on the drawing) and a male thread 98 formed on the other end thereof. The inner rings 84 of the bearings 81 are fixedly interposed between the stepped surface 96 of the spindle 92 and the inner ring seat 91 by a nut 99 engaged with the male thread 98.

In accordance with the aforementioned constitution, the aforementioned angular contact ball bearing 80 is used as a bearing for supporting the spindle 92. Accordingly, the vibration and temperature rise of these angular contact ball bearings 80 can be inhibited even upon high speed rotation of the spindle 92. In other words, the vibration and temperature rise of the spindle 92 and the spindle device 90 due to bearing, too, can be inhibited. In this arrangement, the machining precision of the spindle 92 can be enhanced. Further, a spindle device 90 having a high stillness can be provided. The angular contact ball bearing of the invention can exert similar effects even when supporting the spindle for machine tools other than cutting spindle.

The present invention is not limited to the aforementioned embodiments. In other words, it is only required that the angular contact ball bearing be sealed and the cage made of synthetic resin be guided by rolling elements. In some detail, the shape of the seal and how the cage is supported guided by the rolling elements are not limited. Further, ceramic balls may be used as rolling elements for the purpose of reducing the heat generation.

As can be seen in the foregoing description, in accordance with the angular contact ball bearing of the invention, the scattering of the grease accumulated in the bearing can be inhibited by the non-contact seal member. At the same time, the mounting fitting portion on the non-contact seal member and the inner surface of the outer ring can form a grease storing groove. In this arrangement, the base oil (lubricant)

can be supplied from the grease accumulated in the grease storing groove into the race on the outer ring.

Further, since the aforementioned grease storing groove is formed by the mounting fitting portion on the non-contact seal member and the inner surface of the outer ring, it is not necessary that a grease storing groove be machined on the inner surface of the outer ring every individual bearing.

Accordingly, an angular contact ball bearing can be provided which undergoes little scattering of grease accumulated therein upon high speed rotation and thus can attain prolonged life upon grease-lubricated high speed rotation at a reduced cost.

As mentioned above, in accordance with the angular contact ball bearing of the invention, the cage is supported guided by the rolling elements. Thus, the angular contact ball bearing of the invention can difficultly run out of grease upon high speed rotation, inhibiting the self-excited vibration of the cage and hence making it possible to prevent the generation of abnormal noise. Further, the amount of heat generated by friction can be reduced, making it possible to inhibit the temperature rise.

In accordance with the spindle device of the invention, the spindle of machine tools can be supported by the aforementioned angular contact ball bearing, making it possible to inhibit the vibration and temperature rise of the spindle for machine tools even upon high speed rotation. Accordingly, the machining precision of the machine tools can be enhanced. At the same time, a machine tool spindle having a high stillness can be provided.

What is claimed is:

1. An angular contact ball bearing, comprising:
   an outer ring having an outer ring race formed on an inner surface thereof;
   an inner ring having an inner ring race provided on the outer surface thereof;
   a plurality of rolling elements provided between the outer ring and the inner ring;
   an annular cage for retaining the rolling elements; and
   seals provided on openings between the respective ends of the inner and outer rings,
   wherein the cage is made of a synthetic resin material and is supported through the guide of the rolling elements, and
   wherein the cage includes a plurality of cylindrical pockets arranged peripherally for retaining the rolling elements and a reduced diameter portion formed at ends of the pocket for regulating the radial movement of the cage while being in contact with the rolling element.

2. A spindle device for supporting a spindle for a machine tool by an angular contact ball bearing, the angular contact ball bearing comprising:
   an outer ring having an outer ring race formed on an inner surface thereof;
   an inner ring having an inner ring race provided on the outer surface thereof;
   a plurality of rolling elements provided between the outer ring and the inner ring;
   an annular cage for retaining the rolling elements; and
   seals provided on openings between the respective ends of the inner and outer rings,
   wherein the cage is made of a synthetic resin material and is supported through the guide of the rolling elements, and
   wherein the cage includes a plurality of cylindrical pockets arranged peripherally for retaining the rolling elements and a reduced diameter portion formed at ends of the pocket for regulating the radial movement of the cage while being in contact with the rolling element.

* * * * *